United States Patent
Sawada et al.

(10) Patent No.: US 8,972,153 B2
(45) Date of Patent: Mar. 3, 2015

(54) IDLING CONTROL APPARATUS FOR VEHICLE

(75) Inventors: Shinji Sawada, Tokyo (JP); Hiroki Obayashi, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 730 days.

(21) Appl. No.: 13/307,597

(22) Filed: Nov. 30, 2011

(65) Prior Publication Data

US 2012/0132176 A1    May 31, 2012

(30) Foreign Application Priority Data

Nov. 30, 2010 (JP) ................................. 2010-266953

(51) Int. Cl.
*G06F 19/00* (2011.01)
*G06G 7/70* (2006.01)
*F02N 11/08* (2006.01)

(52) U.S. Cl.
CPC ..... *F02N 11/0837* (2013.01); *F02N 2200/0805* (2013.01); *F02N 2200/124* (2013.01); *F02N 2200/125* (2013.01); *Y02T 10/48* (2013.01)
USPC ........................................ 701/112; 123/179.4

(58) Field of Classification Search
CPC Y02T 10/48; B60W 10/06; B60W 30/18018; F02N 11/0818; F02N 11/084; F02N 2200/0801; F02N 11/0814; F02N 11/0833; F02N 11/0837
USPC ................. 123/179.4, 339.1, 339.14, 339.15; 701/112, 36, 70, 96, 97
See application file for complete search history.

(56) References Cited

U.S. PATENT DOCUMENTS

| | | |
|---|---|---|
| 2007/0272187 A1* | 11/2007 | Celisse et al. ............... 123/179.4 |
| 2010/0010715 A1* | 1/2010 | Inoue ............................... 701/51 |
| 2012/0078466 A1* | 3/2012 | Natori et al. ..................... 701/36 |
| 2012/0191313 A1* | 7/2012 | Miyahara ......................... 701/70 |
| 2014/0005914 A1* | 1/2014 | Bernzen ......................... 701/112 |
| 2014/0278019 A1* | 9/2014 | Be et al. ......................... 701/112 |

FOREIGN PATENT DOCUMENTS

| | | |
|---|---|---|
| JP | 2004-232538 A | 8/2004 |
| JP | 2009-262701 A | 11/2009 |

* cited by examiner

*Primary Examiner* — Mahmoud Gimie
*Assistant Examiner* — Sizo Vilakazi
(74) *Attorney, Agent, or Firm* — McDermott Will & Emery LLP

(57) ABSTRACT

In an idling control apparatus for a vehicle, normally, when a predetermined idling reduction execution condition is satisfied, a signal is output to the engine control device so as to execute idling reduction for stopping the idling operation of an engine to automatically stop it. Further, it is determined whether or not a subject vehicle is stopped against an obstacle for avoidance of danger based on at least one of environmental information in front of the subject vehicle, obstacle information and a driving condition of the subject vehicle before it is stopped. When it is determined that the subject vehicle is stopped against the obstacle for avoidance of danger, automatic engine stop is prohibited.

9 Claims, 5 Drawing Sheets

IDLING CONTROL APPARATUS FOR VEHICLE

CROSS REFERENCES TO RELATED APPLICATIONS

The present application claims priority from Japanese Patent Application No. 2010-266953 filed on Nov. 30, 2010, the entire contents of which are hereby incorporated by reference.

BACKGROUND OF THE INVENTION

1. Field of the Invention

The present invention relates to an idling control apparatus for a vehicle that has an idling reduction function for stopping an idling operation of an engine to automatically stop the engine when a predetermined driving condition is satisfied.

2. Description of the Related Art

In order reduce fuel consumption and emissions, various idling reduction technologies for vehicles have been proposed and put into practical use. These idling reduction technologies automatically stop an engine when the engine is not required to be operated during waiting for a traffic light to change, for a train to pass, for a person to come, and restart the engine when the engine is required to be operated again. For example, Japanese Unexamined Patent Application Publication (JP-A) No. 2004-232538 disclosed a technology for a vehicle having an idling control function that automatically stops an engine based on the actuation of a brake pedal when the vehicle is stopped and restarts the engine based on the release of the brake pedal or the depression of an accelerator pedal. According to this technology, an obstacle detection sensor is provided for detecting an obstacle ahead of the vehicle. When the sensor detects that an obstacle is approaching ahead of the vehicle before the engine is automatically stopped, the automatic engine stop based on the actuation of the brake pedal is prohibited.

The aforementioned idling reduction function is not very effective in reducing fuel consumption or rather increases it when a vehicle is stopped for only a short time. The technology for an idling control apparatus disclosed in JP-A No. 2004-232538 may be effective against this problem. However, this technology prohibits idling reduction whenever an obstacle is approaching ahead of the vehicle. Accordingly, when the vehicle stops due to traffic congestion for example, idling reduction is not performed. As a result, the number of executions of idling reduction substantially decreases, which prevents advantages of idling reduction to be fully achieved.

SUMMARY OF THE INVENTION

The present invention is made in view of the above, and it aims to provide an idling control apparatus for a vehicle that appropriately prohibits only unnecessary idling reduction based on an actual driving situation so as to fully achieve advantages of idling reduction such as a reduction in fuel consumption and emissions.

An aspect of the present invention provides an idling control apparatus for a vehicle that stops an idling operation of an engine to automatically stop the engine when a predetermined condition is satisfied. The idling control apparatus for a vehicle includes a frontal environment recognition unit that obtains environmental information in front of a subject vehicle; an obstacle recognition unit that recognizes an obstacle against the subject vehicle based on the environmental information in front of the subject vehicle; a stop-for-danger-avoidance determination unit that determines whether or not she subject vehicle is stopped against the obstacle based on at least one of the environmental information in front of the subject vehicle, obstacle information from the obstacle recognition unit and a driving condition of the subject vehicle before the vehicle is stopped; and an idling reduction prohibiting unit that prohibits an automatic stop of the engine when she stop-for-danger-avoidance determination unit determines that the subject vehicle is stopped against the obstacle for avoidance of danger.

DESCRIPTION OF THE PREFERRED EMBODIMENTS

An embodiment of the present invention will hereunder be described with reference to the drawings.

Figure 1:
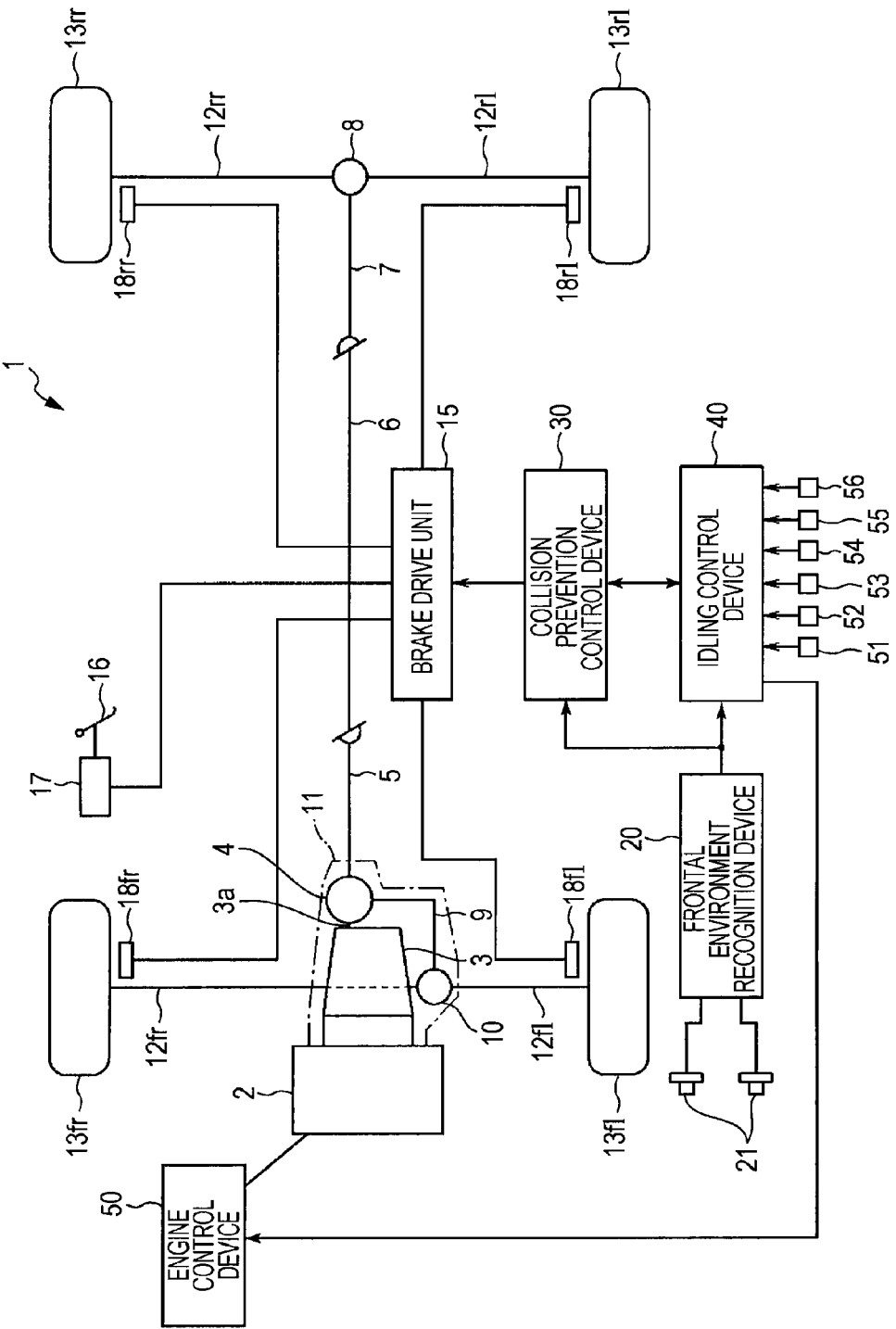
FIG. 1 is a schematic configuration view of a vehicle including an idling control apparatus for a vehicle according to an embodiment of the present invention.

In FIG. 1, reference numeral 1 denotes a subject vehicle. An engine 2 is arranged in a front part of the subject vehicle 1. A drive force generated by the engine 2 is transmitted from an automatic transmission (illustrated as including a torque converter and other components) 3 to a center differential device 4 through a transmission output shaft 3a.

The drive force is input from the center differential device 4 to a rear wheel final reduction gear 8 via a rear drive shaft 5, a propeller shaft 6 and a drive pinion 7, and also input from the center differential device 4 to a front wheel final reduction gear 10 via a front drive shaft 9. The automatic transmission 3, the center differential device 4, the front wheel final reduction gear 10 and the like are housed together in a case 11.

The driving force input to the rear-wheel final reduction gear 8 is transmitted to a rear-left wheel 13*r*l via a rear-wheel left drive shaft 12*r*l and to a rear-right wheel 13*rr* via a rear-wheel right drive shaft 12*rr*. The driving force input to the front-wheel final reduction gear 10 is transmitted to a front-left wheel 13*fl* via a front-wheel left drive shaft 12*fl* and to a front-right wheel 13*fr* via a front-wheel right drive shaft 12*fr*.

A brake drive unit 15 of the subject vehicle has connected thereto a master cylinder 17 that is connected to a brake pedal operated by a driver. When a driver operates (depresses) the brake pedal, a brake pressure is applied, by the master cylinder 17 via the brake drive unit 15, to each wheel cylinder (a front-left wheel cylinder 18*fl*, a front-right wheel cylinder 18*fr*, a rear-left wheel cylinder 18*r*l and a rear-right wheel cylinder 18*rr*) of each of the four wheels 13*fl*, 13*fr*, 13*rl* and 13*rr*, whereby the four wheels are stopped.

The brake drive unit 15 is a hydraulic unit including components such as a pressure-applying source, a pressure-reducing valve and a pressure-increasing valve. The brake drive unit 15 is configured to be capable of applying the brake pressure independently to each of the wheel cylinders 18*fl*, 18*fr*, 18*rl* and 18*rr* according to input signals.

The subject vehicle 1 includes a stereo camera 21, a frontal environment recognition device 20, a collision prevention control device 30 and an idling control device 40.

The stereo camera 21 is a part of a frontal environment recognition unit that obtains environmental information in front of the subject vehicle 1, and is constituted by a left and right par of cameras using solid state imaging devices, for example. The cameras in the pair are attached on front portions of a ceiling of a passenger compartment with a predetermined baseline length therebetween, capture images of an external object in stereo from different points of view, and output image data to the frontal environment recognition device 20.

The frontal environment recognition device 20 has an image processing engine that processes at a high speed an image captured by the stereo camera 21, and serves as a processing unit performing a recognition process based on an output result of the image processing engine and traveling information on the subject vehicle 1 such as a subject vehicle speed Vo. The frontal environment recognition device 20 processes the image captured by the stereo camera 21 in the following manner, for example.

Specifically, firstly, the frontal environment recognition device 20 generates distance information for a pair of stereo images in the traveling direction of the subject vehicle 1 captured by the stereo camera 21, based on an amount of misalignment between corresponding positions in the images. Then, the distance information is subjected to a known grouping process, and the processed information is compared with frames (windows) of previously stored data such three-dimensional road shape data, sidewall data, three-dimensional object data. As a result of the comparison, lane line data and sidewall data such as a guardrail and a curb extending along the road are extracted. In addition, three-dimensional data are extracted and categorized into a vehicle, a crossing pedestrian, a red light (recognized based on the height of a red light emitting part, for example) and other three-dimensional objects such as a utility pole. The obtained data are subjected to a calculation on a coordinate system whose origin is the subject vehicle 1, and whose X-axis and Y-axis are respectively the front-rear direction and lateral direction of the subject vehicle 1. The lane line data, the sidewall data such as a guardrail and a curb extending along the road, types of the three-dimensional objects, distances of the objects from the subject vehicle 1, the center positions, speeds and the like of the obtained data are output to the collision prevention control device 30 and the idling control device 40. For obtained road shapes, the width of each thereof is calculated. Roads with a width of a predetermined value (for example, two meters) or smaller are categorized as a narrow road. This categorization result is also output to the idling control device 40. Furthermore, objects categorized as a vehicle with a speed the direction of which is different from the direction of the speed of the subject vehicle 1 are recognized as an oncoming vehicle. This categorization result is also output to the idling control device 40.

In this embodiment, the stereo camera 21 is used as a recognition sensor. Alternately, however, another system such as a monocular camera, a millimeter-wave radar, an inter-vehicle communication system may be used as a recognition sensor. As indicated above, the frontal environment recognition device 20 serves as a frontal environment recognition unit and an obstacle recognition unit.

Figure 5:
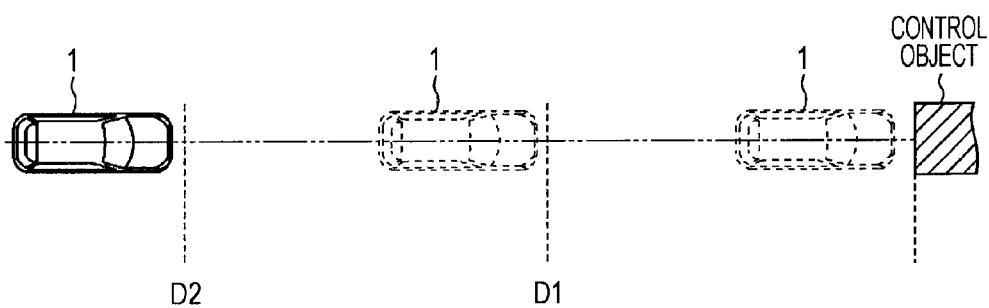
FIG. 5 is an explanatory view showing braking intervention distances that are set between the vehicle and a target object according to the embodiment of the present invention.

The collision prevention control device 30 serves as a collision prevention control unit. When a target object such as a three-dimensional object in front of the subject vehicle 1 is recognized, the collision prevention control device 30 executes control for preventing a collision between the subject vehicle 1 and the target object based on the obstacle information from the frontal environment recognition device 20 according to, for example, a method disclosed in JP-A No. 2009-262701. Specifically, for example, in this collision prevention control, the collision prevention control device 30 sets a first braking intervention distance D1 and a second braking intervention distance D2 as braking intervention distances, with respect to the target object (see FIG. 5).

Figure 4:
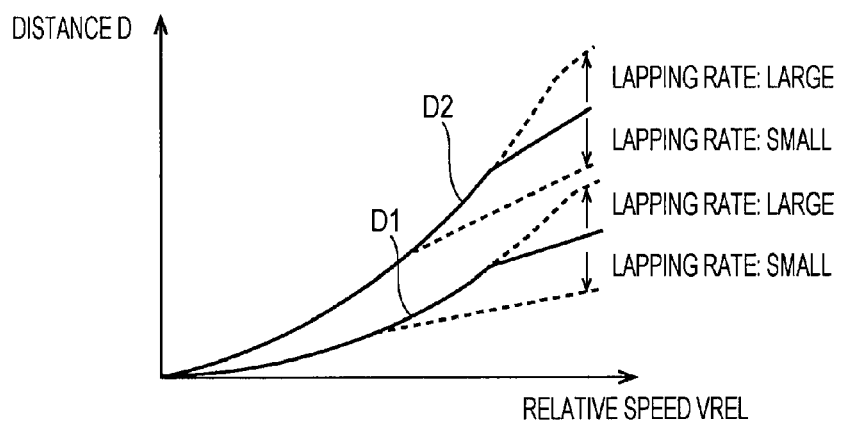
FIG. 4 is a graph showing a relationship of a relative speed and a lapping rate between the vehicle and a target object and a braking intervention distance for collision prevention control according to the embodiment of the present invention.

The first braking intervention distance D1 is a distance limit (collision avoidance distance limit) where it is difficult to avoid a collision with the target object by either one of braking and steering. The first braking intervention distance D1 is previously set based on an experiment, a simulation or the like. The collision avoidance distance limit changes according to, for example, a relative speed Vrel between the subject vehicle 1 and the target object, and further changes according to a lapping rate R1 between the subject vehicle 1 and the target object. A map showing a relationship of the relative speed Vrel and the lapping rate R1 between the subject vehicle 1 and the target object, and the first braking intervention distance D1, as shown in FIG. 4 for example, is previously set and stored in the collision prevention control device 30. The collision prevention control device 30 sets the first braking intervention distance D1 by referring to the map.

The second braking intervention distance D2 is set so as to be longer than the first braking intervention distance D1 by a predetermined distance. Specifically, the second braking intervention D2 is previously set, for example, based on an experiment, a simulation or the like, and is set longer than the collision avoidance distance limit by a predetermined distance toward the subject vehicle according to the relative speed Vrel. A map showing a relationship of the relative speed Vrel and the lapping rate R1 between the subject vehicle 1 and the target object, and the second braking intervention distance D2, as shown in FIG. 4 for example, is previously set and stored in the collision prevention control device 30. The collision prevention control device 30 sets the second braking intervention distance D2 by referring to the map.

When a relative distance d between the subject vehicle 1 and the target object becomes equal to or shorter than the first braking intervention distance D1, the collision prevention control device 30 executes braking control through an automatic braking intervention (hereinafter also referred to as full braking control). In the full braking control, for example, the collision prevention control device 30 sets a predetermined fixed value to each of a deceleration (target deceleration) to be generated by braking control, and a permitted amount of change in the deceleration (deceleration change amount) upon generating the target deceleration, and calculates a deceleration instruction value based on these. Then the collision prevention control device 30 outputs the calculated deceleration instruction value to the brake drive unit 15 so as to actuate (apply) automatic braking.

When the relative distance d is longer than the first braking intervention distance D1 and equal to or shorter than the second braking intervention distance D2, the collision prevention control device 30 executes braking control with an automatic braking intervention (hereinafter also referred to as enhanced braking control) prior to the full braking control. In the enhanced braking control, for example, the collision prevention control device 30 variably sets the target deceleration and the deceleration change amount and calculates the deceleration instruction value based thereon. Then the collision prevention control device 30 outputs the calculated deceleration instruction value to the brake drive unit 15 to actuate (apply) automatic braking.

An actuation signal indicating collision prevention control that is actuated by the collision prevention control device 30 is output to the idling control device 40.

The idling control device 40 receives the road information and obstacle information from the frontal environment recognition device 20, the actuation signal of collision prevention control from the collision prevention control device 30, the subject vehicle speed Vo from a vehicle speed sensor 51, a steering wheel angle θH from a steering wheel angle sensor 52, a longitudinal acceleration Gx from a longitudinal acceleration sensor 53, a position of a shift lever from a shift lever position sensor 54, and a depressing amount of the accelerator pedal from an accelerator pedal depressing amount sensor 56.

Normally, when a predetermined driving condition (automatic engine stop condition: idling reduction execution condition) is satisfied, the idling control device 40 outputs a signal to an engine control device 50 so as to execute idling reduction for stopping the idling operation of the engine 2 to automatically stop the engine 2. When the automatic engine stop is not permitted (idling reduction is prohibited), the idling control device 40 prohibits the execution of idling reduction.

The idling reduction execution condition refers to, for example, a state that satisfies all following conditions: the brake pedal is depressed; the accelerator pedal is not depressed, the shift lever is positioned in any one of "P" "N", "D" "Third Gear", "Second Gear" and "First. Gear"; the subject vehicle speed Vo is substantially zero; and a battery is still adequately charged.

The state in which the execution of idling reduction is prohibited refers to a state in which it is determined that the subject vehicle 1 is stopped for avoidance of danger. The subject vehicle 1 is considered to be stopped for avoidance of danger in any one of the following states:

(1) The subject vehicle 1 is stopped against an obstacle according to automatic braking actuated by the collision prevention control device 30;

(2) The subject vehicle 1 is stopped against a crossing pedestrian.

Figure 6:
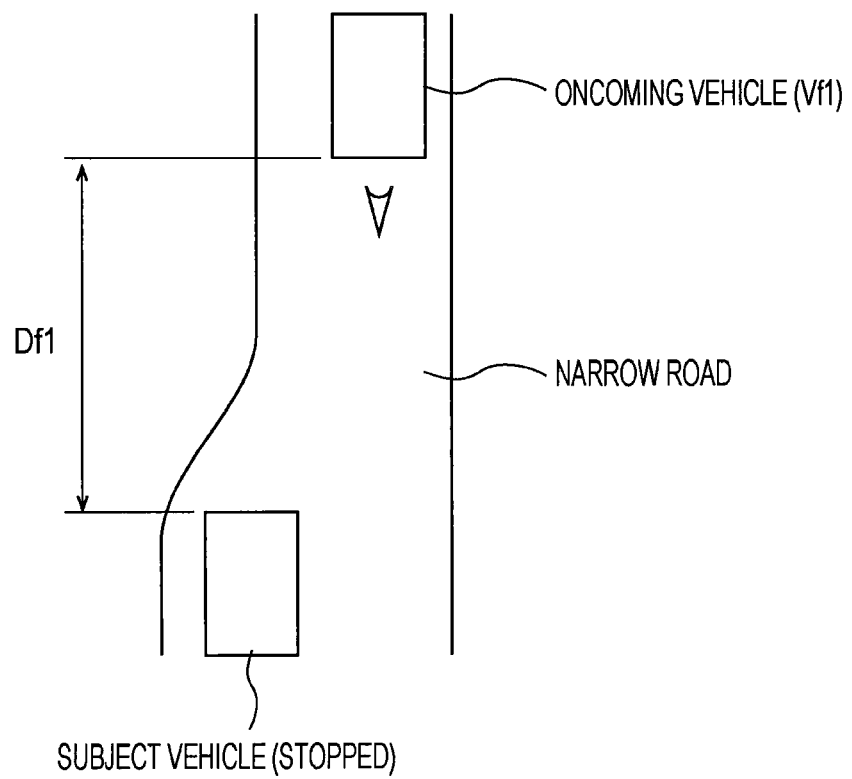
FIG. 6 is an explanatory view of a relationship between the vehicle and an oncoming vehicle according to the embodiment of the present invention.

(3) The subject vehicle 1 is stopped against an oncoming vehicle, a narrow road is detected ahead of the subject vehicle 1, and an amount of time passed before the subject vehicle 1 passes by the oncoming vehicle (time calculated by Df1/Vf1 in a situation shown in FIG. 6, where Df1 is a distance between the subject vehicle 1 and the oncoming vehicle, and Vf1 is a speed of the oncoming vehicle) is equal to or shorter than a predetermined time period;

(4) When the subject vehicle 1 is stopped against, an obstacle, a braking operation for the stop is started within a predetermined time period;

(5) When the subject vehicle 1 is stopped against an obstacle, the deceleration generated is equal to or larger than a predetermined value until the stop; and (6) When the subject vehicle 1 is stopped against an obstacle, a steering wheel is operated with a steering speed (deH/dt) of a predetermined value or larger during a braking operation until the stop.

Even if it is determined that the subject vehicle 1 stopped for avoidance of danger in the aforementioned manner, when a red light is recognized ahead of the subject vehicle 1, a determination that the subject vehicle 1 is not stopped for avoidance of danger is given priority, and idling reduction is permitted.

When the engine is automatically stopped by idling reduction, and a predetermined condition for restarting the engine 2 is satisfied, the idling control device 40 outputs a signal to the engine control device 50 so as to restart the engine 2. The predetermined condition for restarting the engine 2 refers to, for example, a state that the aforementioned idling reduction execution condition is not satisfied. Thus, the idling control device 40 serves as a stop-for-danger-avoidance determination unit and an idling reduction prohibiting unit.

Figure 2:
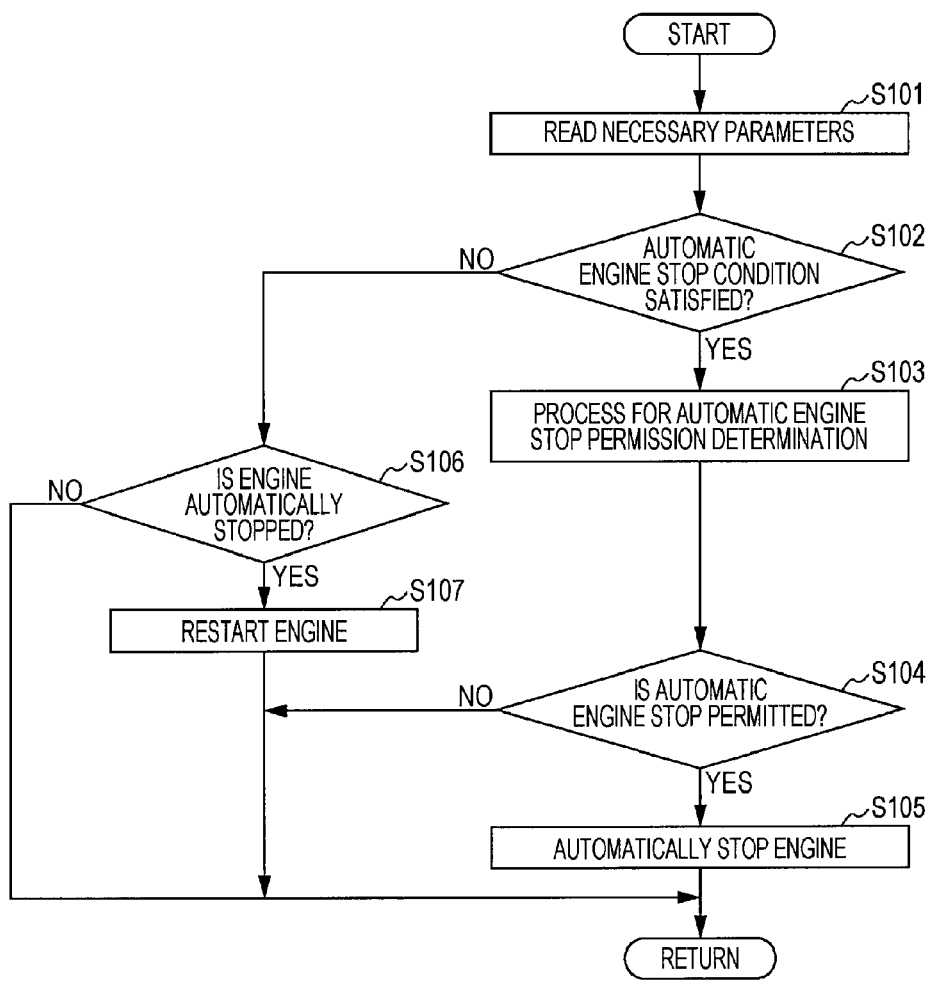
FIG. 2 is a flowchart of an idling control program according to the embodiment of the present invention.

Next, idling control executed by the idling control device 40 will be described with reference to the flowchart shown in FIG. 2

Firstly, in step (hereinafter abbreviated as "S") 101, necessary parameters are read such as the recognized road information and obstacle information from the frontal environment, recognition device 20, the actuation signal for collision prevention control from the collision prevention control device 30, the subject vehicle speed Vo from the vehicle speed sensor 51, the steering wheel angle θH from the steering wheel angle sensor 52, the longitudinal acceleration Gx from the longitudinal acceleration sensor 53, the position of the shift lever from a shift lever position sensor 54, and the depressing amount of the accelerator pedal from the accelerator pedal depressing amount sensor 56.

In following S102, it is determined whether or not the aforementioned automatic engine stop condition (idling reduction execution condition) is satisfied. If the idling reduction execution condition is satisfied, the program proceeds to S103, where a process for automatic engine stop permission determination is executed (the process for automatic engine stop permission determination will be described later with reference to the flowchart, shown in FIG. 3). Then in S104, it is determined whether automatic engine stop permission determination is permitted.

If it is determined in S104 that automatic engine stop permission determination is permitted, the program proceeds to S105, where a signal is output to the engine control device 50 to execute idling reduction that stops the idling operation of the engine 2 to automatically stop the engine 2. Then the program is exited.

If the idling reduction execution condition is not satisfied in S102, the program proceeds to S106, where it is determined whether or not the engine is being automatically stopped (that is, idling reduction is being performed). When idling reduction is not being performed, the program is exited without any change. If idling reduction is being performed, the program proceeds to S107, where a signal is output to the engine control device 50 to restart the engine 2. Then the program is exited.

Figure 3:
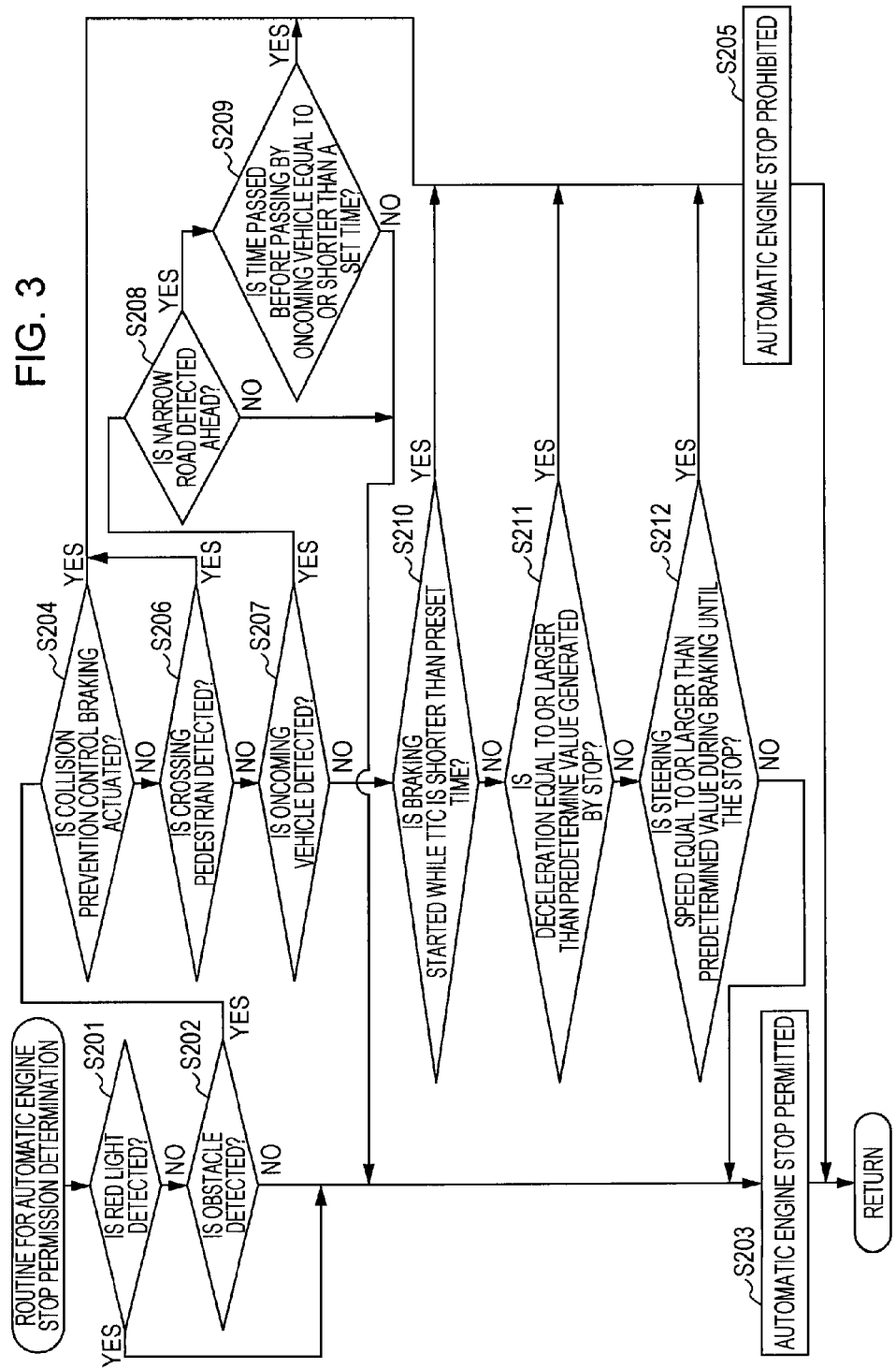
FIG. 3 is a flowchart of a routine for automatic engine stop permission determination according to the embodiment of the present invention.

Next, the process for automatic engine stop permission determination executed in S103 will be described with reference to the flowchart shown in FIG. 3.

Firstly, in S201, it is determined whether or not a red light is detected as a result of the recognition performed by the frontal environment recognition device 20.

If it is determined in S102 that a red light is not detected, the process proceeds to S202. If a red light is detected, the process proceeds to S203 to permit automatic engine stop, and then exits the routine.

In S202, it is determined whether or not an obstacle is detected as a result of the recognition performed by the frontal environment recognition device 20. If an obstacle is not detected, the process proceeds to S203 to determine that automatic engine stop is permitted, and then exits the routine.

If an obstacle is detected, the process proceeds to S204. In step 204, when the subject vehicle 1 is stopped against the obstacle, it is determined whether or not the subject vehicle 1 is stopped against the obstacle according to automatic braking actuated by the collision prevention control device 30. If it is determined in S204 that the subject vehicle 1 is stopped according to automatic braking actuated by the collision prevention control device 30, it is determined that the subject vehicle 1 is stopped for avoidance of danger (the case (1)). Then the process proceeds to S205 to determine that automatic engine stop is prohibited, and then exits the routine.

If the vehicle is not stopped due to automatic braking actuated by the collision prevention control device 30, the process proceeds to S206.

In S206, it is determined whether or not the obstacle recognized by the frontal environment recognition device 20 when the subject vehicle 1 is stopped is a crossing pedestrian. If the obstacle is a crossing pedestrian, it is determined that the subject vehicle 1 is stopped for avoidance of danger (the case (2)). Then the process proceeds to S205 to determine that automatic engine stop is prohibited, and then exits the routine.

If it is determined in S206 that the obstacle is other than a crossing pedestrian, the process proceeds to S207, where it is determined whether or not the obstacle recognized by the frontal environment recognition device 20 when the subject vehicle 1 is stopped is an oncoming vehicle. If the obstacle is an oncoming vehicle, the process proceeds to S208.

In S208, it is determined whether or not a narrow road id detected ahead of the subject vehicle 1. If a narrow road is detected, the process proceeds to S209.

In S209, it is determined whether or not an amount of time passed before the subject vehicle 1 passes by the oncoming vehicle (Df1/Vf1 in FIG. 6) is equal to or shorter than a predetermined time period. If the amount of time is equal to or shorter than the predetermined time period, it is determined that the subject vehicle 1 is stopped for avoidance of danger (the case (3)). Then the process proceeds to S205 to determine that automatic engine stop is prohibited, and exits the routine.

If a narrow road is not detected in S208, or if the amount of time is longer than the predetermined time period in S209, the process proceeds to S203 to determine that automatic engine stop is permitted, and then exits the routine.

If it is not determined in S207 that the obstacle recognized by the frontal environment recognition device 20 is an oncoming vehicle, the process proceeds to S210.

In S210 it is determined whether or not a braking operation for the stop of the subject vehicle 1 against an obstacle is started within a predetermined time period. Specifically, is determined whether or not a braking operation for the stop is started while an expected time to collision TTC is equal to or short than a predetermined time period.

It is determined in S210 that a braking operation for the stop is started while the expected time to collision TIC is equal to or shorter than the predetermined time period, it is determined that the subject vehicle 1 is stopped for avoidance of danger (the case (4)). Then the process proceeds to S205 to determine that automatic engine stop is prohibited, and exits the routine.

If a braking operation for the stop is started while the expected time to collision TIC is longer than the predetermined time period, the process proceeds to S211.

In S211, when the subject vehicle 1 stopped against an obstacle, it is determined whether or not the longitudinal acceleration Gx from the longitudinal acceleration sensor 53 becomes equal to or larger than a predetermined deceleration until the stop. If the deceleration generated becomes equal to or larger than the predetermined value until the stop, it is determined that the subject vehicle 1 is stopped for avoidance of danger (the case (5)). Then the process proceeds to S205 to determine automatic engine stop is prohibited, and exits the routine.

If the deceleration generate does not become equal to or larger than the predetermined value until the stop, the process proceeds to S212.

In S212, when the subject vehicle 1 is stopped against an obstacle, it is determined whether or not a steering wheel is operated with a steering speed (dθH/dt) of a predetermined value or larger during a braking operation until the stop. If it is determined the steering wheel is operated with a steering speed (dθH/dt) of the predetermined value or larger during the braking operation until the stop, it is determined chat the subject vehicle 1 is stopped for avoidance of danger (the case (6)). Then the process proceeds to S205 to determine automatic engine stop is prohibited, and then exits the routine.

If the steering wheel is not operated with a steering speed (dθH/dt) of the predetermined value or larger during the braking operation until the stop, the process proceeds to S203 to determine that automatic engine stop is permitted, and then exits the routine.

Thus, according to the above-described embodiment of the present invention, normally, when the predetermined idling reduction execution condition is satisfied, a signal is output to the engine control device 50 so as to execute idling reduction for stopping the idling operation of the engine 2 to automatically stop it. Further, it is determined whether or not the subject vehicle 1 is stopped against the obstacle for avoidance of danger based on at least one of the environmental information in front of the subject vehicle 1, the obstacle information and a driving condition of the subject vehicle 1 before it is stopped. When it is determined that the subject vehicle 1 is stopped against the obstacle for avoidance of danger, automatic engine stop is prohibited. As a result, only unnecessary idling reduction is appropriately prohibited by determining with a high accuracy whether or not the subject vehicle 1 is stopped against the obstacle for avoidance of danger based on actual driving situations so as to fully achieve advantages of idling reduction such as a reduction in fuel consumption and emissions.

What is claimed is:

1. An idling control apparatus for a vehicle that stops an idling operation of an engine to automatically stop the engine when a predetermined condition is satisfied, the idling control apparatus for a vehicle comprising:
   a frontal environment, recognition unit that obtains environmental information in front of a subject vehicle;
   an obstacle recognition unit that recognizes an obstacle against the subject vehicle based on the environmental information in front of the subject vehicle;
   a stop-for-danger-avoidance determination unit that determines whether or not the subject vehicle is stopped against the obstacle based on at least one of the environmental information in front of the subject vehicle, obstacle information from the obstacle recognition unit and a driving condition of the subject vehicle before the vehicle is stopped; and
   an idling reduction prohibiting unit that prohibits an automatic stop of the engine when the stop-for-danger-avoidance determination unit determines that the subject vehicle is stopped against the obstacle for avoidance of danger.

2. The idling control apparatus for a vehicle according to claim 1 wherein the stop-for-danger-avoidance determination unit determines that the subject vehicle is stopped against the obstacle for avoidance of danger when the subject vehicle is stopped, and the obstacle against the subject vehicle is a crossing pedestrian.

3. The idling control apparatus for a vehicle according to claim 1 wherein the stop-for-danger-avoidance determination unit determines that the subject vehicle is stopped against the obstacle for avoidance of danger when the obstacle against the subject vehicle is an oncoming vehicle, a narrow road is detected ahead of the subject vehicle, and an amount of time lasted before the subject vehicle passes by the oncoming vehicle is equal to or shorter than a predetermined time period.

4. The idling control apparatus for a vehicle according to claim 2 wherein the stop-for-danger-avoidance determination unit determines that the subject vehicle is stopped against the obstacle for avoidance of danger when the obstacle against the subject vehicle is an oncoming vehicle, a narrow road is detected ahead of the subject vehicle, and an amount of time lasted before the subject vehicle passes by the oncoming vehicle is equal to or shorter than a predetermined time period.

5. The idling control apparatus for a vehicle according to claim 1 wherein the stop-for-danger-avoidance determination unit determines that the subject vehicle is stopped against the obstacle for avoidance of danger when the subject vehicle is stopped, and a braking operation for the stop is started while an expected time to collision TIC is equal to or shorter than a predetermined time period.

6. The idling control apparatus for a vehicle according to claim 1 wherein the stop-for-danger-avoidance determination unit determines that the subject vehicle is stopped against the obstacle for avoidance of danger when the subject vehicle is stopped against an obstacle, and a deceleration generated becomes equal to or larger than a predetermined value until the stop.

7. The idling control apparatus for a vehicle according to claim 1 wherein the stop-for-danger-avoidance determination unit determines that the subject vehicle is stopped against the obstacle for avoidance of danger when the subject vehicle is stopped against an obstacle, and a steering wheel is operated with a steering speed of a predetermined value or larger during a braking operation until the stop.

8. The idling control apparatus for a vehicle according to claim 1 further comprising a collision prevention control unit that prevents a collision between the obstacle and the subject vehicle by actuating automatic braking, wherein the stop-for-danger-avoidance determination unit determines that the subject vehicle is stopped against the obstacle for avoidance of danger when the subject vehicle is stopped against the obstacle according to automatic braking actuated by the collision prevention control unit.

9. The idling control apparatus for a vehicle according to claim 1 wherein the frontal environment recognition unit detects at least a red light ahead of the subject vehicle, and, when the red light is recognized ahead of the subject vehicle, the stop-for-danger-avoidance determination unit gives priority to a determination that the subject vehicle is not stopped for avoidance of danger and idling reduction is permitted.

* * * * *